United States Patent
Horn et al.

(10) Patent No.: US 10,574,582 B2
(45) Date of Patent: Feb. 25, 2020

(54) NETWORK PROPERTY VERIFICATION

(71) Applicant: FUJITSU LIMITED, Kawasaki-shi, Kanagawa (JP)

(72) Inventors: Alexander Horn, Sunnyvale, CA (US); Ali Kheradmand, Urbana, IL (US)

(73) Assignee: FUJITSU LIMITED, Kawasaki (JP)

( * ) Notice: Subject to any disclaimer, the term of this patent is extended or adjusted under 35 U.S.C. 154(b) by 111 days.

(21) Appl. No.: 15/802,370

(22) Filed: Nov. 2, 2017

(65) Prior Publication Data

US 2019/0132250 A1   May 2, 2019

(51) Int. Cl.
| | |
|---|---|
| *H04L 12/851* | (2013.01) |
| *H04L 29/06* | (2006.01) |
| *H04L 12/26* | (2006.01) |
| *H04L 12/863* | (2013.01) |

(52) U.S. Cl.
CPC ........ *H04L 47/2441* (2013.01); *H04L 43/045* (2013.01); *H04L 47/2483* (2013.01); *H04L 47/627* (2013.01); *H04L 63/0263* (2013.01); *H04L 47/24* (2013.01); *H04L 63/0236* (2013.01)

(58) Field of Classification Search
CPC . H04L 47/2441; H04L 47/627; H04L 43/045; H04L 47/2483; H04L 63/0263; H04L 63/0236; H04L 47/24
See application file for complete search history.

(56) References Cited

U.S. PATENT DOCUMENTS

| | | | | |
|---|---|---|---|---|
| 6,980,555 | B2 * | 12/2005 | Mar | H04L 29/06 370/389 |
| 9,596,215 | B1 * | 3/2017 | Goel | G06F 16/24561 |
| 2002/0124086 | A1 * | 9/2002 | Mar | H04L 29/06 709/226 |
| 2007/0086337 | A1 * | 4/2007 | Li | H04L 45/742 370/229 |
| 2008/0037539 | A1 * | 2/2008 | Paramaguru | H04L 45/742 370/392 |

(Continued)

OTHER PUBLICATIONS

Ball, T., Bjørner et al., "VeriCon: Towards verifying controller programs in software- defined networks." PLDI, Jun. 2014.

(Continued)

*Primary Examiner* — Will W Lin
(74) *Attorney, Agent, or Firm* — Maschoff Brennan

(57) ABSTRACT

A method may include obtaining packet handling rules from network nodes in a network. The method also includes, using the rules, generating a transitive reduction of a partially ordered set of elements, where the elements correspond to match conditions in the rules, each match condition representing a set of packets identified by packet headers. The method may also include generating packet equivalence classes (PECs) by removing children elements from a parent element in the transitive reduction, where each PEC covers disjoint sets of packets, and each PEC is identified by fields in the packet headers including source address, destination address, and protocol of packets. The PECs may represent a group of packets treated in a same manner in the network. The method may also include generating a graph representation of the network nodes utilizing the PECs, and, using the graph representation, verifying properties of operation of the network.

20 Claims, 11 Drawing Sheets

(56) References Cited

U.S. PATENT DOCUMENTS

| | | | | |
|---|---|---|---|---|
| 2013/0287018 A1* | 10/2013 | Miller | ................ | H04L 12/6418 370/357 |
| 2018/0351825 A1* | 12/2018 | Thomson | ................ | H04L 41/12 |
| 2019/0059117 A1* | 2/2019 | Shu | ....................... | H04W 76/19 |

OTHER PUBLICATIONS

Beckett,R.,Zou,X.K.,Zhang,S.,Malik,S.,Rexford, J., and Walker, D., "An assertion language for debugging SDN applications" HotSDN, Aug. 22, 2014.

Canini, M. et al. "A Nice way to test openflow applications." NSDI Apr. 2012.

Fayaz, S. K, and Sekar, V., "Testing stateful and dynamic data planes with FlowTest." HotSDN, Aug. 22, 2014.

Fayaz, S. K, Yu, T., Tobioka, Y., Chaki, S., and Sekar, V., "Buzz: Testing context-dependent policies in stateful networks." Networked Systems Design and Implementation, Mar. 2016.

Stoenescu, R., Popovici, M., Negreanu, L., and Raiciu, C., "SymNet: Scalable symbolic execution for modern networks." SIGCOMM, Aug. 2016.

Velner, Y., Alpernas, K., Panda, A., Rabinovich, A., Sagiv, M., Shenker, S., and Shoham, S., "Some complexity results for stateful network verification." TACAS, Apr. 9, 2016.

Al-Shaer, E., and Al-Haj, S., "FlowChecker: Configuration analysis and verification of federated OpenFlow Infrastructures." SafeConfig, Jan. 2010.

Al-Shaer, E., Marrero, W., El-Atawy, A., and El- Badawi, K., "Network configuration in a box: towards end-to- end verification of network reachability and security." ICNP, Oct. 12, 2009.

Bjørner, N., Juniwal, G., Mahajan, R., Seshia, S. A., and Varghese, G., "ddNF: An efficient data structure for header spaces." HVC, Aug. 8, 2016.

Fogel, A., Fung, S., Pedrosa, L., Walraed-Sullivan, M., Govindan, R., Mahajan, R., and Millstein, T., "A general approach to network configuration analysis." Networked Systems Design and Implementation, May 2015.

Sember-Jacobson, A., Viswanathan, R., Akella, A., and Mahajan, R., "Fast control plane analysis using an abstract representation." SIGCOMM, Aug. 22, 2016.

Jayaraman, K., Bjørner, N., Outhred, G., and Kauf- Man, C., "Automated analysis and debugging of network connectivity policies." Tech. rep., Microsoft Research, Jul. 26, 2014.

Kazemian, P., Chang, M., Zeng,H., Varghese, G., McKeown, N., and Whyte, S., "Real time network policy checking using header space analysis." Networked Systems Design and Implementation (2013).

Jeffrey, A., and Samak, T., "Model checking firewall policy configurations." Policy (2009).

Kazemian, P., Varghese, G., and Mckeown, N., "Header space analysis: Static checking for networks." Networked Systems Design and Implementation (2012).

Khurshid, A., Zou, X., Zhou, W., Caesar, M., and God- Frey, P. B., "VeriFlow: Verifying network-wide invariants in real time." Networked Systems Design and Implementation Apr. 3, 2013.

Lopes, N. P., Bjørner, N., Godefroid, P., Jayaraman, K., and Varghese, G., "Checking beliefs in dynamic networks." Networked Systems Design and Implementation, May 2015.

Mai, H., Khurshid, A., Agarwal, R., Caesar, M., God- Frey, P. B., and King, S. T., "Debugging the data plane with Anteater." SIGCOMM, Aug. 2011.

Maldonado-Lopez, F. A., Calle, E., and Donoso, Y., "Detection and prevention of firewall-rule conflicts on software-defined networking." RNDM, Oct. 2015.

Nelson, T., Barratt, C., Dougherty, D. J., Fisler, K, and Krishnamurthi, S., "The Margrave tool for firewall analysis." LISA (2010).

Son, S., Shin, S., Yegneswaran, V., Porras, P. A., and Gu, G., "Model checking invariant security properties in Open- Flow." ICC (2013).

Xie, G. G., Zhanm, J., Maltz, D. A., Zhang, H., Green- Berg, A., Hjalmtysson, G., and Rexford, J., "On static reachability analysis of IP networks." INFOCOM, Jun. 2005.

Yang, H., and Lam, S. S.. "Real-time verification of network properties using atomic predicates." In ICNP, Oct. 7, 2013.

Yuan, L., Mai, J., Su, Z., Chen, H., Chuah, C.-N., and Mohapatra, P., "Fireman: A toolkit for firewall modeling and analysis." SP, May 21, 2006.

Kourie, D. G., Obiedkov, S., Watson, B.W. and van der Merwe, D., "An incremental algorithm to construct a lattice of set intersections." In Science of Computer Programming, vol. 4, Issue 3, Jan. 2009. pp. 128-142.

U.S. Appl. No. 15/264,501, filed Sep. 13, 2016.

* cited by examiner

NETWORK PROPERTY VERIFICATION

FIELD

The embodiments discussed in the present disclosure are related to network property verification.

BACKGROUND

With the proliferation of computer networks, and the expansion of the complexity of networks, network property errors can be difficult to identify or detect. Most network property verification techniques place a load on the network via additional traffic in the network.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a method that includes obtaining multiple packet handling rules from network nodes in a network. The method also includes, generating a transitive reduction of a partially ordered set of elements, where the elements correspond to match conditions in the packet handling rules, and each match condition represents a set of packets identified by packet headers. The method may also include generating packet equivalence classes by removing children elements from a parent element in the transitive reduction of the partially ordered set of elements, where each packet equivalence class covers disjoint sets of packets, and each packet equivalence class may be identified by fields in the packet headers including at least one of source address, destination address, and protocol of packets. The packet equivalence classes may represent a group of packets treated in a same manner in the network. The method may also include generating a graph representation of the network nodes utilizing the packet equivalence classes. The method also includes, using the graph representation, verifying one or more properties of operation of the network to identify one or more network issues.

One or more embodiments of the present disclosure may include a method that includes obtaining packet handling rules from at least one firewall in a network and at least one routing table in the network, and translating the packet handling rules to canonical data structures based on priority of rules at a given routing table or a given firewall. Each canonical data structure may represent a subset of packets affected by one or more corresponding packet handling rules such that each packet handling rule is covered by at least one canonical data structure. The method may also include generating a graph representation of the firewalls and the nodes corresponding to the routing tables in the network. The method may additionally include labeling a vertex in the graph representation with a first canonical data structure based on the first canonical data structure being associated with a first packet handling rule of the given firewall, where the vertex corresponds to the given firewall in the graph representation. The method may additionally include labeling an edge in the graph representation with a second canonical data structure based on the second canonical data structure being associated with a second packet handling rule of the given routing table, where the edge corresponds to the given routing table. The method may also include, using the graph representation, verifying one or more network properties to identify any network issues.

The object and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
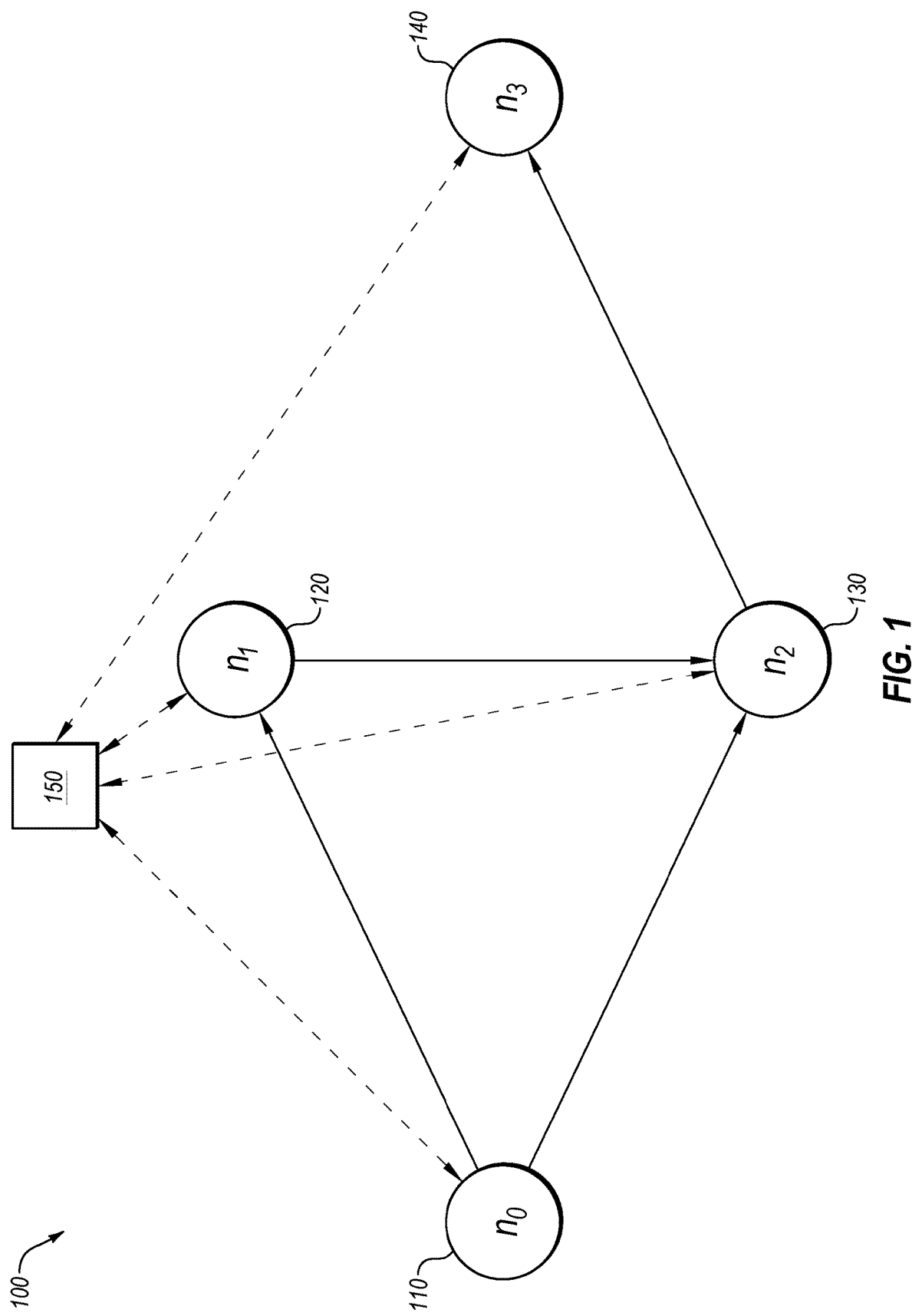
FIG. 1 illustrates an example representation of a network.

Some embodiments of the present disclosure relate to network property verification based on packet handling rules in the network. The network property verification may be performed by generating sub-sets of packets via which the performance of the network may be analyzed. In some embodiments, the packet handling rules in the network from routing tables and/or firewalls may be analyzed to generate packet equivalence classes (PECs). PECs may represent a group of potential packets in the space of all potential packets in a network. For example, in internet protocol (IP) based networks, the groups of packets may represent a set of packets with header fields in common such as a particular range of source IP addresses, destination IP addresses, protocols, etc. The PECs may represent a set of packets that are treated in a similar manner in the network based on the packet handling rules of that network. To generate PECs, a set of all unique sub-sets of packets associated with the packet handling rules may be identified as elements in a diagram, and combined using parent-child relationships for sets completely covered by other sets. An example of such a diagram includes a Hasse diagram. The PECs may represent an element in the diagram with the packets corresponding to the children elements of that element removed from the set of packets corresponding to the element. In some embodiments, the packet handling rules may be correlated with the PECs that correspond to the address ranges affected by the rule. Such correlation may be based on the priority of other rules at a given node in the network.

After PECs have been generated for a network, a graph representation of the network may be generated and the graph representation may be labeled at the vertices and edges. The graph representation may include vertices for the nodes in the network and edges for the connections between the nodes. The vertices may be labeled with the PECs of the firewall packet handling rules of the corresponding nodes that accept packets at the corresponding nodes. The edges may be labeled with the PECs of the packet handling rules of the routing tables based on the next hops of where the routing tables indicate the packets are to be routed in the network.

Using the labeled graph representation, network properties may be verified. For example, reachability may be checked in the graph representation by verifying that packet handling rules that include a source and a destination address can reach the destination from the source by following PEC labels corresponding to the rule from the source, along edges and through vertices, to the destination. As another example, consistency checks may be performed between the firewall and routing table rules by verifying that for vertices labeled with PECs, there are edges coming in to and/or going out from a given vertex that are also labeled with the PECs. Stated in terms of packet handling rules, the consistency checks may verify that if a node is configured to accept packets per the firewall packet handling rules, there is a way for that node to receive such packets and to forward on those packets via the routing table packet handling rules. As an additional example, verification may be performed within a sub-graph where all edges are labeled with a PEC that each vertex in the sub-graph is also labeled with the PEC. Stated in terms of packet handling rules, for a portion of the network where the routing table packet handling rules indicate packets should be routed through that portion of the network, the verification checks that the firewalls also accept those packets at the nodes in that portion of the network. In addition to these examples, other network property verifications may be performed.

Because of the difficulty in analyzing an IP network, one or more embodiments of the present disclosure may provide a solution to a technical problem that allows a network to operate in an improved manner. For example, some embodiments of the present disclosure provide a solution that may verify properties of both routing tables and firewalls in a network. Furthermore, the present disclosure accomplishes this improvement without sending excessive packets through the network to analyze and monitor the network. Rather, the present disclosure utilizes a graph representation of the network, thereby reducing the burden on the network when verifying network properties. Additionally, using the data structures of the present disclosure, a more streamlined and efficient storage mechanism and processing mechanism as compared to other attempts to verify network properties may be used. Thus, embodiments of the present disclosure provide a solution that improves the functioning of computers and networks, and also provide improvements to the field of network verification.

Embodiments of the present disclosure are explained with reference to the accompanying drawings.

FIG. 1 illustrates an example representation of a network 100, in accordance with one or more embodiments of the present disclosure. FIG. 1 includes nodes $n_0$ 110, $n_1$ 120, $n_2$ 130, $n_3$ 140, and a control device 150. The control device 150 may be configured to obtain one or more packet handling rules from one or more of the nodes 110-140 in the network 100 to verify operation of the network 100. For example, the control device 150 may use packet handling rules from the nodes 110-140 in the network 100 to identify one or more errors in the operation of the network 100.

The nodes 110-140 in the network 100 may be configured to handle packets being routed through the network 100. For example, the nodes 110-140 may be configured to utilize routing tables and/or firewalls to identify how a given node is to handle a particular packet. The routing tables may include packet handling rules that identify what a next hop or next node is for a set of packets, for example, as identified by an internet protocol (IP) header designating a destination address of the packet. The routing tables may list the packet handling rules in priority order, such that a lower rule may not be checked unless the higher rule is not satisfied. An example set of routing tables are provided below in TABLE 1:

TABLE 1

| Node | Destination | Next Hop |
|---|---|---|
| $n_0$ 110 | 0.0.0.12/30 | $n_2$ 130 |
| $n_0$ 110 | 0.0.0.0/28 | $n_1$ 120 |
| $n_1$ 120 | 0.0.0.12/30 | $n_2$ 130 |
| $n_2$ 130 | 0.0.0.12/30 | $n_3$ 140 |

Such packet handling rules may provide an indication of where a packet, destined for a particular destination, is to be routed next. For example, with respect to the rule for the node $n_2$, for packets arriving at the node $n_2$ with a destination address within the range of 0.0.0.12/30, the packets may be routed to the node $n_3$, for example, via a port that is known to be in communication with the node $n_3$.

The firewalls may include packet handling rules that provide additional packet handling operations for a node in the network. For example, the packet handling rules of a firewall may identify a source and a destination address (or range of addresses), a network protocol applicable to the rule (e.g., any protocol ("ANY"), internet control message protocol (ICMP), user datagram protocol (UDP), excluding a protocol ("NOT"), etc.), and an action associated with the rule (e.g., ACCEPT or DROP the packets). The firewalls may list the packet handling rules in priority order, such that a lower rule may not be checked unless the higher rule is not satisfied. An example set of firewall rules for the nodes $n_0$, $n_1$, $n_2$, and $n_3$ are provided below:

TABLE 2

| Node | Source | Destination | Protocol | Action |
|---|---|---|---|---|
| $n_0$ 110 | 0.0.0.64/27 | 0.0.0.8/29 | NOT ICMP | ACCEPT |
| $n_0$ 110 | 0.0.0.112/28 | 0.0.0.12/32 | UDP | ACCEPT |
| $n_0$ 110 | 0.0.0.0/0 | 0.0.0.0/0 | ANY | DROP |
| $n_1$ 120 | 0.0.0.0/30 | 0.0.0.10/31 | ANY | ACCEPT |
| $n_1$ 120 | 0.0.0.0/0 | 0.0.0.0/0 | ANY | DROP |
| $n_2$ 130 | 0.0.0.64/27 | 0.0.0.8/29 | ANY | ACCEPT |
| $n_2$ 130 | 0.0.0.64/27 | 0.0.0.8/29 | ICMP | DROP |
| $n_2$ 130 | 0.0.0.112/28 | 0.0.0.12/32 | UDP | ACCEPT |
| $n_2$ 130 | 0.0.0.0/0 | 0.0.0.0/0 | ANY | DROP |
| $n_3$ 140 | 0.0.0.64/27 | 0.0.0.0/28 | NOT ICMP | ACCEPT |
| $n_3$ 140 | 0.0.0.112/28 | 0.0.0.12/32 | UDP | ACCEPT |
| $n_3$ 140 | 0.0.0.0/0 | 0.0.0.0/0 | ANY | DROP |

Such packet handling rules may provide an indication of whether or not packets will be accepted at a given node or dropped at a given node. For example, with respect to the rules for the node $n_1$, for packets arriving at the node $n_1$ with a source address within the range 0.0.0.0/30 and destined for a destination address within the range of 0.0.0.10/31 using any protocol, such packets may be accepted at the node $n_1$; and packets arriving at the node $n_1$ with any other properties (e.g., a source address within the range 0.0.0.0/0 and destined for a destination address within the range of 0.0.0.0/0 using any protocol, as a lower priority rule) may be dropped at the node $n_1$.

Figure 2:
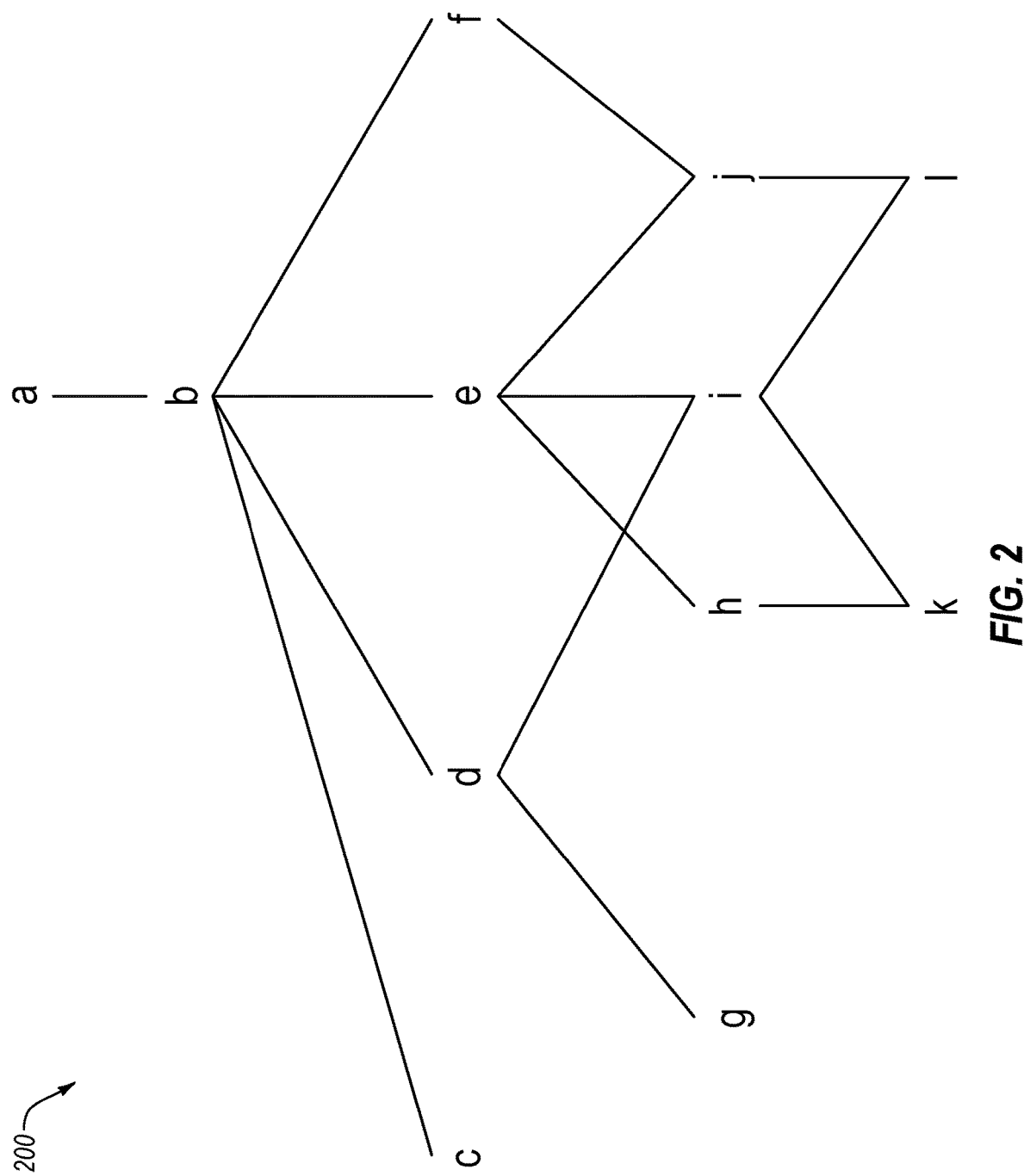
FIG. 2 illustrates an example element diagram.

In some embodiments, the various packet handling rules from routing tables, firewalls, and/or other packet handling rules may be utilized to designate elements in a diagram that designates groups of unique packets and their relationships with each other. For example, the elements may be arranged in a lattice, a semi-lattice, etc. or any other data structure. FIG. 2 illustrates an example of such a diagram. In these and other embodiments, the elements may represent groups of packets, each with a unique combination of match conditions regarding source/destination address ranges and protocols in the network 100. Such elements may include a source address range, a destination address range, and/or a protocol. For example, using the packet handling rules from TABLE 1 and TABLE 2, the following elements may be generated:

TABLE 3

| Element | Source | Destination | Protocol |
|---|---|---|---|
| a | 0.0.0.0/0 | 0.0.0.0/0 | ANY |
| b | 0.0.0.0/0 | 0.0.0.0/28 | ANY |
| c | 0.0.0.0/30 | 0.0.0.10/31 | ANY |
| d | 0.0.0.0/0 | 0.0.0.12/30 | ANY |
| e | 0.0.0.64/27 | 0.0.0.8/29 | ANY |
| f | 0.0.0.64/27 | 0.0.0.0/28 | NOT ICMP |
| g | 0.0.0.112/28 | 0.0.0.12/32 | UDP |
| h | 0.0.0.64/27 | 0.0.0.8/29 | ICMP |
| i | 0.0.0.64/27 | 0.0.0.12/30 | ANY |
| j | 0.0.0.64/27 | 0.0.0.8/29 | NOT ICMP |
| k | 0.0.0.64/27 | 0.0.0.12/30 | ICMP |
| l | 0.0.0.64/27 | 0.0.0.12/30 | NOT ICMP |

Such elements may represent the closed set of all match conditions of the packet handling rules being analyzed in the network 100. For example, looking at match conditions based on the packet handling rules of Tables 1 and 2, seven unique match conditions exist. However, because the elements are closed set elements, additional elements are utilized. For example, elements e and f represent the match conditions for the highest priority rules in nodes $n_2$, and $n_3$. However, element j is also created because it represents the overlap of the two elements. The diagram generated using the elements is described in greater detail with respect to FIG. 2.

The elements of TABLE 3 may be used to generate canonical data structures to represent disjoint groups of packets, which collectively describe the forwarding behavior of stateless network devices. As used herein, the term canonical data structure may refer to a data structure that represents a set of packets, where reference to the set of packets is the same format and structure, regardless of syntax used to write rules regarding the set of packets or regardless of the vendor/manufacturer of a device carrying such a rule. One example of a canonical data structure is a packet equivalence class (PEC). As described above, PECs may represent a group of packets that are handled the same in the network 100. The use of such canonical data structures may facilitate the verification of network properties in the network 100. The remainder of the disclosure may refer to PECs with an understanding that other canonical data structures may be used in a manner consistent with the present disclosure.

In some embodiments, the PECs may represent a subset of packets where the children of that subset of packets are removed from the subset of packets. For example, the element a may include a set of all packets, while the PEC A may represent the element a with the packets of the element b removed. Following the example above, the following PECs may be generated, with the corresponding description of determining the PEC:

TABLE 4

| PEC | Set of Packets (described in terms of Elements from TABLE 3) |
|---|---|
| A | a − b |
| B | b − (c ∪ d ∪ e ∪ f) |
| C | c |
| D | d − (g ∪ i) |
| E | e − (h ∪ i ∪ j) |
| F | f − j |
| G | g |
| H | h − k |
| I | i − (k ∪ l) |
| J | j − l |
| K | k |
| L | l |

A description of the use of such PECs to verify one or more network properties may be described with reference to FIGS. 3-11.

Using the PECs of TABLE 4, the packet handling rules of TABLES 1 and 2 may be represented by PECs. For example, TABLES 5 and 6 illustrate a correlation of the packet handling rules of TABLES 1 and 2, respectively, with the PECs. Such correlation may be based on priority of the rules such that applicable PECs may first be assigned to higher priority rules and lower priority rules receive any remaining applicable PECs.

TABLE 5

| Node | PEC Representation | Next Hop |
|---|---|---|
| $n_0$ 110 | {D, G, I, K, L} | $n_2$ 130 |
| $n_0$ 110 | {B, C, E, F, H, J} | $n_1$ 120 |
| $n_1$ 120 | {D, G, I, K, L} | $n_2$ 130 |
| $n_2$ 130 | {D, G, I, K, L} | $n_3$ 140 |

TABLE 6

| Node | PEC Representation | Action |
|---|---|---|
| $n_0$ 110 | {J, L} | ACCEPT |
| $n_0$ 110 | {G} | ACCEPT |
| $n_0$ 110 | {A, B, C, D, E, F, H, I, K} | DROP |
| $n_1$ 120 | {C} | ACCEPT |
| $n_1$ 120 | {A, B, D, E, F, G, H, I, J, K, L} | DROP |
| $n_2$ 130 | {E, H, I, J, K, L} | ACCEPT |
| $n_2$ 130 | { } | DROP |
| $n_2$ 130 | {G} | ACCEPT |
| $n_2$ 130 | {A, B, C, D, F} | DROP |
| $n_3$ 140 | {F, J, L} | ACCEPT |
| $n_3$ 140 | {G} | ACCEPT |
| $n_3$ 140 | {A, B, C, D, E, H, I, K} | DROP |

Figure 3:
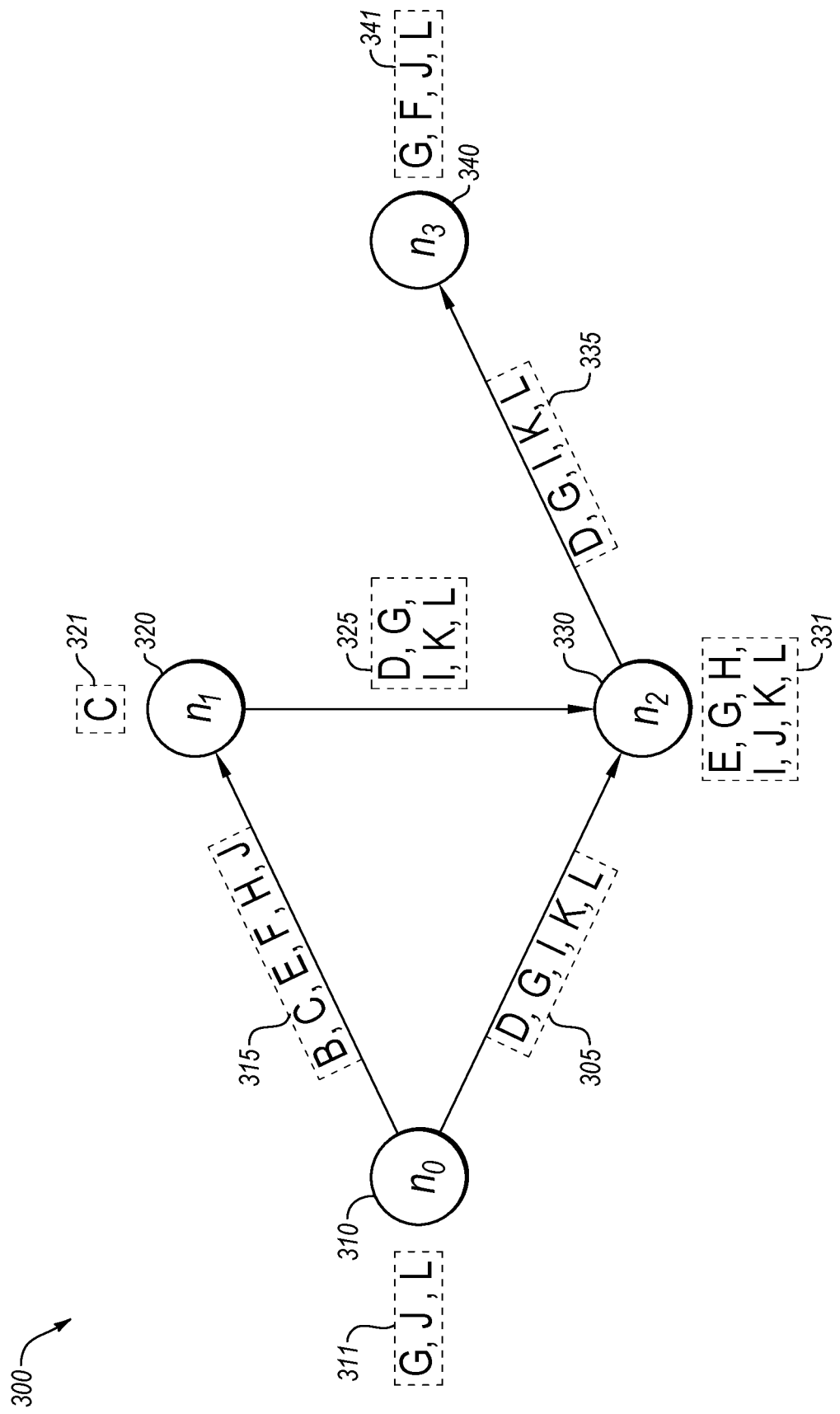
FIG. 3 illustrates the example representation of a network of FIG. 1 with labels at vertices and edges.

In some embodiments, to facilitate the verification of one or more properties of the network 100, a graph representation of the nodes and connections between nodes in the network 100 may be generated. An example of such a representation is illustrated in FIG. 3. The vertices of the graph representation representing the nodes in the network 100 may be labeled with the PECs associated with the packet handling rules that indicate that the given node accepts the packets within those PECs. The edges of the graph representation representing the connections between the nodes in the network 100 may be labeled with the PECs associated with the packet handling rules that indicate that the packets within those PECs are routed from the node at the start of the edge to the node at the end of the edge.

In some embodiments, cardinality of the various PECs may be determined to facilitate the verification of network properties. For example, for a given PEC, a determination may be made as to the number of unique combinations of iterations of packet properties that may exist for a given PEC. For example, for the PEC G, the cardinality may be sixteen, as there is one possible protocol (UDP), one possible destination address (0.0.0.12/32), and sixteen possible source addresses (0.0.0.112/28), yielding (1×1×16=16). While non-zero values for cardinality may be used in accordance with the present disclosure, determining the cardinality of the various PECs may be beneficial in detecting empty PECs, e.g., PECs with a cardinality of zero. An example method of determining cardinality and/or updating cardinality determinations for various PECs based on new elements being added to the diagram of elements may be described with reference to FIG. 5.

The nodes 110-140 may include any network component, device, or system configured to receive, drop, route, forward, or otherwise handle network packets. For example, the nodes 110-140 may include a router, a switch, a hub, a gateway, a bridge, a repeater, etc. The nodes 110-140 may be implemented as a physical device (such as a computing device illustrated in FIG. 12) or as one or more virtual devices operating on one or more physical devices.

The control device 150 may be configured to obtain the packet handling rules from the network devices in the network 100. Additionally or alternatively, the control device 150 may be configured to obtain a layout of a data plane of the network 100 at a given point in time. The data plane may refer to how packets are routed through the network 100, for example, the combination of the physical layout of the network 100 and how the devices within the network 100 route packets among the devices based on the packet handling rules. In these and other embodiments, the control device 150 may obtain the packet handling rules of each of the nodes and the physical connections between the nodes. In some embodiments, the control device 150 may be in communication with each of the nodes 110-140 (as indicated by the dashed lines). Additionally or alternatively, the control device 150 may be in communication with another electronic device that monitors the physical layout and/or the packet handling rules of the network 100. In these and other embodiments, the control device 150 may be implemented as a computing device or a computing system such as the computing system 1200 of FIG. 12.

In some embodiments, the control device 150 may be configured to verify one or more properties of the network 100. The properties may include network paths, network reachability, distances measured between points in the network 100 according to the number of hops a packet may traverse for it to be delivered to the expected recipient, a form of packet travel time between two points in the network 100 as a function of distance and capabilities of network links, network service time, among others. For example, the control device 150 may be configured to verify that a packet travels through the network 100 as expected by the control device 150, or that a packet travels through the network 100 as quickly as expected, or the like. For example, an administrator of the network 100 may expect a certain ingress and egress to be available, a certain network path to be followed, or a certain network packet travel time to be within a threshold. In some embodiments, the properties may be metrics placed by the administrator. In these and other embodiments, the properties may be based on packet handling rules of one or more devices within the network 100. Other properties may include detecting loops in the network 100 and identifying network devices from which a packet may never be forwarded, also known as "blackholes."

In some embodiments, the control device 150 may verify one or more properties of the network by generating a graph representation of the network 100 and labeling the edges and vertices of the graph representation with PECs. In these and other embodiments, the control device 150 may apply one or more analyses (such as those illustrated in FIGS. 7-11) to the labeled graph representation. For example, the control device 150 may be instructed to verify a property, such as identify any redundant packet handling rules in the network 100. Using the PECs and the graph representation, the control device 150 may label the graph representation with PECs to facilitate the verification of the network properties.

In some embodiments, based on all properties being verified, the control device 150 may generate a message indicating that the network 100 is behaving as expected. In some embodiments, if on one or more properties are violated, the control device 150 may take one or more actions to notify and/or otherwise address the lack of verification (e.g., by constructing a counterexample that exhibits the property violation). In some embodiments, the control device 150 may generate a message to cause one or more network devices of the network 100 to change or update the packet handling rules of the network devices. As another example, the control device 150 may cause one or more network devices of the network 100 to activate or deactivate one or more physical communication channels. As an additional example, the control device 150 may cause one or more network devices of the network 100 to power down, power up, or otherwise adjust a mode of operation of the network device. In these and other embodiments, the action may be a remedial action to change the operation of the network 100 to more closely match the expected behavior of the network 100. If the observed changes in the network 100 are due to an erroneous manual or automated reconfiguration of the network (rather than, for example, a failure in the network), the control device 150 may ignore, delay (with an appropriate warning message to the network operators), or reverse, the triggered changes of the network 100 to preserve expected behavior of the network 100.

The network 100 may include a conventional type of network, a wired or wireless network, and/or may have numerous different configurations. Furthermore, the network 100 may include a local area network (LAN), a wide area network (WAN) (e.g., the Internet), or other interconnected data paths across which multiple devices and/or entities may communicate. In some embodiments, the network 100 may include a peer-to-peer network. The network 100 may also be coupled to or may include portions of a telecommunications network for sending data in a variety of different communication protocols (e.g., internet protocol suite (including for example, internet protocol (IP), transmission control protocol (TCP), user datagram protocol (UDP), internet control message protocol (ICMP), hypertext transfer protocol (HTTP), post office protocol (POP), and the like), AppleTalk, internetwork packet exchange/sequenced packet exchange (IPX/SPX), Open Systems Interconnection (OSI), Systems Network Architecture (SNA), DECnet, and others). In some embodiments, the network 100 may include Bluetooth® communication networks or cellular communication networks for sending and receiving communications and/or data including via short message service (SMS), multimedia messaging service (MMS), hypertext transfer protocol (HTTP), direct data connection, wireless application protocol (WAP), e-mail, or other approaches. The network 100 may also include a mobile data network that may include third-generation (3G), fourth-generation (4G), long-term evolution (LTE), long-term evolution advanced (LTE-A), Voice-over-LTE ("VoLTE") or any other mobile data network or combination of mobile data networks.

Modifications, additions, or omissions may be made to the network 100 without departing from the scope of the present disclosure. For example, the network 100 may include any number of network devices connected in any manner and with any combination of packet handling rules. In many cases, the network 100 may include more network devices than illustrated.

FIG. 2 illustrates an example element diagram, in accordance with one or more embodiments of the present disclosure. For example, the element diagram 200 of FIG. 2 may include a representation of the elements described above with reference to TABLE 3, and indicate the relationships between the elements. The element diagram 200 of FIG. 2 may be referred to as a Hasse diagram, and may represent a meet-semilattice. Such a diagram may represent a transitive reduction of a partially ordered set of elements that includes a meet (or a greatest lower bound).

As illustrated in FIG. 2, the diagram 200 may include relationships between elements (indicated as solid lines) when the element below an element (referred to as a child element) is completely included within the upper element (referred to as a parent element). For example, element a is the parent of element b. Element b is the parent of elements c, d, and f. Thus, the set of packets corresponding to the element c falls completely within the set of packets defined by the element b, and the set of packets defined by the element a. As another example, the set of packets corresponding to the element i falls within the set of packets defined by the element d and the set of packets defined by the element e.

FIG. 3 illustrates an example representation 300 of the network of FIG. 1 with labels at vertices and edges in the representation 300, in accordance with one or more embodiments of the present disclosure. The representation 300 may include the nodes $n_0$, $n_1$, $n_2$, and $n_3$ (310, 320, 330, and 340, respectively). The representation 300 may be labeled with PECs based on the packet handling rules of the various nodes in the network. In some embodiments, the vertices may be labeled with PECs associated with packet handling rules from firewalls and edges may be labeled with PECs associated with packet handling rules from routing tables.

As illustrated in the representation 300 of FIG. 3, the node $n_0$ may include a set of PECs 311 labeled at that node. The set 311 may include the PECs G, J, and L, indicating that the node $n_0$ accepts the packets that are within the PECs G, J, and L based on the packet handling rules of the firewall(s) of the node $n_0$. Similar sets 321, 331, and 341, including the PECs C; E, G, H, I, J, K, L; and G, F, J, L, respectively, may also be labeled at the nodes $n_1$, $n_2$, and $n_3$, respectively.

As illustrated in the representation 300 of FIG. 3, the edge between the node $n_0$ and the node $n_1$ may be labeled with a set of PECs 315 labeled at that edge based on the routing table at the node $n_0$. The set 315 may include the PECs B, C, E, F, H, and J, indicating that the node $n_0$ forwards packets within the PECs B, C, E, F, H, and J to the node $n_1$. Similar sets, including the set 305 including the PECs D, G, I, K, and L labeling the edge between the nodes $n_0$ and $n_1$; the set 325 including the PECs D, G, I, K, and L labeling the edge between the nodes $n_1$ and $n_2$; and the set 335 including the PECs D, G, I, K, and L labeling the edge between the nodes $n_2$ and $n_3$, are also included in the representation 300.

By labeling the edges and vertices of the representation 300, various properties may be verified as described in FIGS. 4-11.

Any of the methods of FIGS. 4-11 may be performed by any suitable system, apparatus, or device. For example, the network 100 of FIG. 1 or one or more of the components thereof such as the control device 150 may perform one or more of the operations associated with the methods of FIGS. 4-11. In these and other embodiments, program instructions stored on a computer readable medium may be executed to perform one or more of the operations of the methods of FIGS. 4-11. Modifications, additions, or omissions may be made to any of the methods of FIGS. 4-11 without departing from the scope of the present disclosure. For example, the operations of the methods of FIGS. 4-11 may be implemented in differing order. Additionally or alternatively, two or more operations may be performed at the same time.

Figure 4:
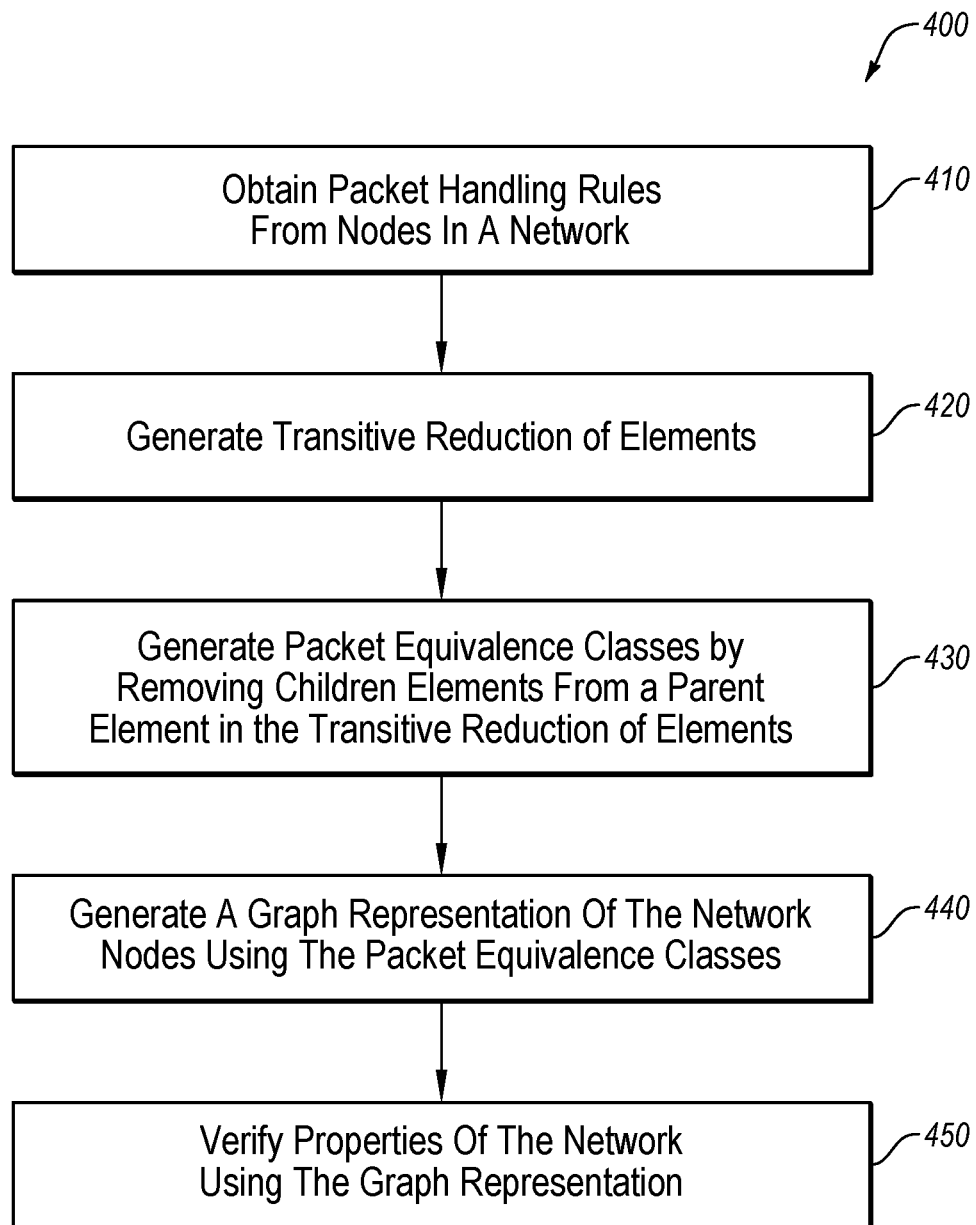
FIG. 4 illustrates a flowchart of an example method of network property verification.

FIG. 4 illustrates a flowchart of an example method 400 of network property verification, in accordance with one or more embodiments of the present disclosure. Although illustrated as discrete blocks, various blocks may be divided into additional blocks, combined into fewer blocks, or eliminated, depending on the particular implementation.

At block 410, packet handling rules may be obtained from nodes in a network. For example, a control device (such as the control device 150 of FIG. 1) may obtain packet handling rules from one or more routing tables and/or one or more firewalls within the network (such as the network 100 of FIG. 1). In some embodiments, the packet handling rules may be obtained indirectly from the nodes, for example, from an intermediate device that may monitor and/or otherwise track the network.

At block 420, a transitive reduction of a partially ordered set of elements may be generated. For example, based on the packet handling rules, a set of elements corresponding to the various packet handling rules obtained at block 410 may be organized into the transitive reduction. An example of such a transitive reduction is the Hasse diagram illustrated in FIG. 2. In these and other embodiments, the elements may correspond to subsets of packets that may be identified based on a destination address, source address, protocol, and/or action associated with the subset of packets. In some embodiments, the organization of the elements into the transitive reduction of the partially ordered set of elements may include creating relationships between the elements based on whether or not a subset is subsumed within another set. Such relationships may be referred to as parent/child relationships.

At block 430, packet equivalence classes may be generated by removing children elements from parent elements in the transitive reduction of the partially ordered set of elements. For example, packets represented by the direct children elements of a parent element may be removed from the set of packets represented by the parent element to yield the set of packets associated with a given packet equivalence class. An example of such packet equivalence classes may be observed in TABLE 4 and with reference to FIG. 2. For example, the PEC B may be generated by taking the set of packets represented by the element b of the transitive reduction and removing the packets represented by any of the elements c, d, e, or f.

At block 440, a graph representation of the network nodes may be generated using the packet equivalence classes. For example, each node in the network may be represented as a vertex in a graph representation and the connections between the nodes may be represented as edges in the graph representation. Various portions of the graph representation may be labeled or otherwise associated with various PECs based on the packet handling rules of the various nodes in the network. For example, vertices in the graph representation may be labeled with PECs associated with packet handling rules of a firewall of a node that indicate that the node accepts the packets associated with the PEC. As another example, edges in the graph representation may be labeled with PECs associated with packet handling rules of routing tables indicating that the packets associated with the PECs are routed along that edge.

At block 450, the graph representation may be used to verify one or more properties of the network. For example, the labels of the graph representation may be analyzed to verify that the network properties are functioning as expected. Such a verification may facilitate the identification of one or more network issues. In some embodiments, such a verification may be performed without any or minimal traffic on the network. For example, rather than sending packets from each potential packet equivalence class through the network, the packet handling rules may be obtained and the network properties may be verified based on the packet handling rules, rather than additional traffic in the network.

Figure 5:
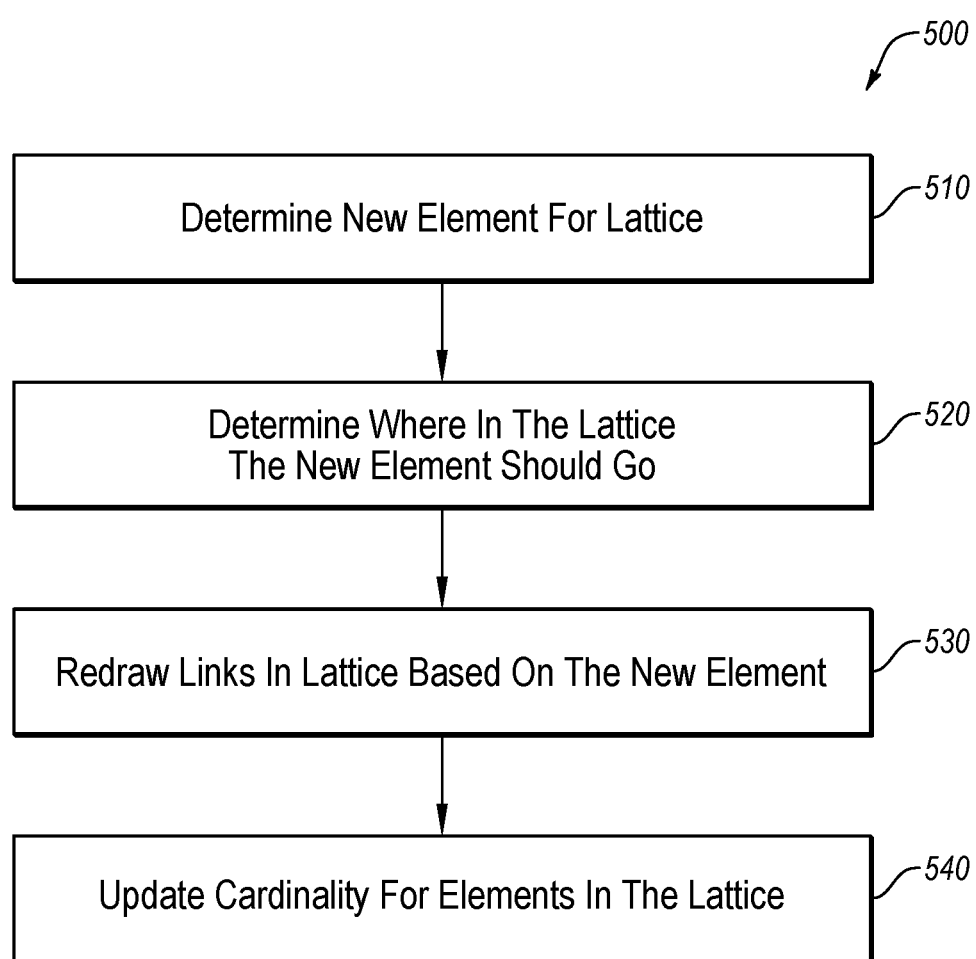
FIG. 5 illustrates a flowchart providing an example implementation of and/or greater detail to one or more blocks of the flowchart of FIG. 4, such as block 420.

FIG. 5 illustrates a flowchart providing a method 500 of an example implementation of and/or greater detail to one or more blocks of the flowchart of FIG. 4, such as block 420, in accordance with one or more embodiments of the present disclosure. In some embodiments, the method 500 may illustrate operations used to update a lattice (an example of a transitive reduction of a partially ordered set of elements) with a new element and/or determine the cardinality of or update the cardinality of the elements of the lattice.

At block 510, a new element may be determined for a lattice. For example, when a new node is brought online in a network, a determination may be made whether any new elements are to be added to the lattice. In some embodiments, if new elements are to be added to the lattice, a determination may be made as to what elements may have their cardinality affected be the addition of the new element.

At block 520, a determination may be made as to where in the lattice the new element should go. For example, with reference to FIG. 2, if the element d were being added to the lattice, a determination may be made that the element d is subsumed within the set of packets identified by a and so the element d should be below the element a, and that the element d is subsumed within the set of packets identified by b and so the element d should be below the element d. As a further example, the elements g and i are subsumed by d and so the element d should be above the elements g and i.

At block 530, links in the lattice may be redraw based on the new element. For example, with the addition of element d, the line from b to d would be drawn after the insertion of the element d.

At block 540, the cardinality for one or more elements in the lattice may be updated. For example, a number of elements may be identified as being affected by the addition of the new element. The cardinality of these elements may be updated by first updating the cardinality of children elements, and then updating the parent element cardinalities based on the updated children cardinalities.

An example implementation of the method 500 above may be illustrated by multiple algorithms implemented using sample programming code as illustrated below, for the procedures Insert(element), Insert_Node(parent, n), and Compute_Cardinality(root). For the sample code portions provided below the variables Modified_Nodes and Root may be called in any of the three functions.

```
Sample Code 1 - Insert(element)
1:       procedure Insert(element)
2:           Modified_Nodes ← { }
3:           n, is_new ← Find_Or_Create_Node(element)
4:           if is_new then
5:               Modified_Nodes.insert(n)
6:               Insert_Node(Root, n)
7:               modified_nodes' ← Modified_Nodes
8:               for n' ∈ modified_nodes' do
9:                   Compute_Cardinality(n')
```

With reference to the lines above, Line 1 calls the procedure. Line 2 initializes the variable Modified_Nodes as an empty set. The set Modified_Nodes may represent the set of nodes that may be affected by the addition of the new element such that the cardinality may be updated. Line 3 determines whether the element called in the function is new. The function Find_Or_Create Node(element) may call a hashtable or other look-up mechanism to determine whether or not the element is already in the lattice. Line 4 starts an if loop if the element is new. Line 5 inserts the element n into the set of Modified_Nodes. Line 6 calls the Insert_Node algorithm based on the new element n and the global Root of the lattice. Line 7 stores a local copy of the Modified_Nodes set as modified_nodes'. Line 8 and Line 9 perform the Compute_Cardinality operation for each element n' of the local copy modified_nodes'.

```
Sample Code 2 - Insert_Node(parent, n)
1:       procedure Insert_Node(pasrent, n)
2:           Γ ← { }
3:           for child ∈ parent.children do
4:               if child.element ⊆ n.element then
5:                   Γ.insert(child)
6:               else if n.element ⊆ child.element then
7:                   Insert_Node(child, n)
8:                   return
9:               else
10:                  e' ← n.element ∩ child.element
11:                  if e' is not empty then
12:                      n', is_new ← Find_Or_Create_Node(e')
```

```
13:             Γ.insert(n')
14:             if is_new then Insert_Node(child, n')
15:         parent.children.insert(n)
16:         Modified_Nodes.insert(parent)
17:         max_children ← {c ∈ Γ | ∀c' ∈ Γ:c.element ⊆ c'.element → c = c'}
18:         if max_children is not empty then
19:             Modified_Nodes.insert(n)
20:         for max_child ∈ max.children do
21:             parent.children.erase(max_child)
22:             n.childre.insert(max_child)
```

With reference to the lines above, Line 1 calls the procedure. Line 2 initializes the variable Γ as an empty set. The set Γ may represent the set of nodes that may be affected by the addition of the new element and that may be children of the element n called in the initial procedure call. Line 3 initializes a set of tasks to be performed for each child of the children of the parent from the initial function call. Line 4 starts an if loop if the child is a subset of the new element n. Line 5 inserts the element child into the set Γ. Line 6 starts an else if loop for if the new element n is a subset of the child. Line 7 calls the Insert_Node algorithm based on the new child as the new parent and the new element n. Line 8 ends the routine after Insert_Node(child, n) is performed. Line 9 starts an else loop. Line 10 designates e' as the union of the n.element and the child.element. Line 11 starts an if loop if e' is not empty, or in other words, if there are some elements in the overlap between the new element n and the child element but neither is a complete subset of the other. Line 12 checks if e' is new, and if so, labels it as n'. The operation Find_Or_Create_Node may be the same as described above for Sample Code 1. Line 13 inserts n' (the overlap of child and n) into Γ. Line 14 calls the procedure Insert_Node(child, n') with the child as the parent and n as the new element if n' is new. Line 15 adds n as a child of parent, creating a relationship between parent and n in the lattice. Line 16 adds parent to Modified_Nodes such that the cardinality of the parent will be updated. Line 17 determines the set of max_children as the set of children who are children of the set Γ with the largest subsets who are still children of n. For example, with reference to FIG. 2, if element d were analyzed, g and i would be maximal children even though k and/or l may show up in Γ. Line 18 starts an if loop for any elements in max_children. Line 19 adds n to Modified_Nodes. Line 20 starts a set of operations to be performed for each element max_child of max_children. Line 21 erases the link from parent to max_child and redraws the relationship from max_child to n.

```
Sample Code 3 - Compute_Cardinality(root)
1:      procedure Compute_Cardinality(root)
2:          root.pec_cardinality ← cardinality(root.element)
3:          queue, visisted ← [root], {root}
4:          while queue is not empty do
5:              n ← queue.dequeue( )
6:              for child ∈ n.children do
7:                  if child ∉ visited then
8:                      if child ∈ Modified_Nodes then
9:                          Compute_Cardinality(child)
10:                     visited.insert(child)
11:                     c ← child.pec_cardinality
12:                     n.pec_cardinality ← n.pec_cardinality - c
13:                     queue.enqueque(child)
14:             if is_new then Insert_Node(child, n')
15:         Modified_Nodes.erase(n)
```

With reference to the lines above, Line 1 calls the procedure. Line 2 initializes the variable root.pec_cardinality as the cardinality of the root.element. The function cardinality( ) determines a number of potential packets within the element. For example, as described above with respect to the element g of Table 4, the cardinality may be 16. Line 3 initializes the sets queue and visited. Both queue and visited are utilized such that a child is not double-counted in determining the cardinality. For example, with reference to FIG. 2, in removing the children from the parents, i may be removed from e and d, and if considered in both when removing e and d from b, the cardinality may be incorrect due to removing the packets associated with i twice. Line 4 starts a loop of operations to perform while queue continues to have elements to be analyzed. Line 5 removes the next element from queue and labels it as n. Line 6 starts loop to be performed for each child of n. Line 7 starts an if loop for a given child that is not in already in visited, meaning it has not already been accounted for. Line 8 starts an if loop for a child that is already in Modified_Nodes. Line 9 calls the Compute_Cardinality procedure for the child if it is in Modified_Nodes. Line 10 then places the child into visited such that the child will not be counted multiple times. Line 11 determines the cardinality of the child and sets the cardinality as c. Line 12 updates the n.pec_cardinality as the n.pec_cardinality subtracting out c. Line 13 adds child to queue. Line 14 removes n from Modified_Nodes.

In addition to being utilized to perform one or more of the operations of FIG. 4, the method 500 of FIG. 5 may be utilized to update an existing set of cardinalities for a set of PECs. For example, when a new network node comes online or a new packet handling rule is added to an existing routing table or firewall, the method 500 may be implemented to update cardinalities of the PECs and or create new PECs. In some embodiments, the method 500 may be utilized iteratively with the addition of new rules to create a lattice and to determine cardinalities for associated PECs.

Figure 6:
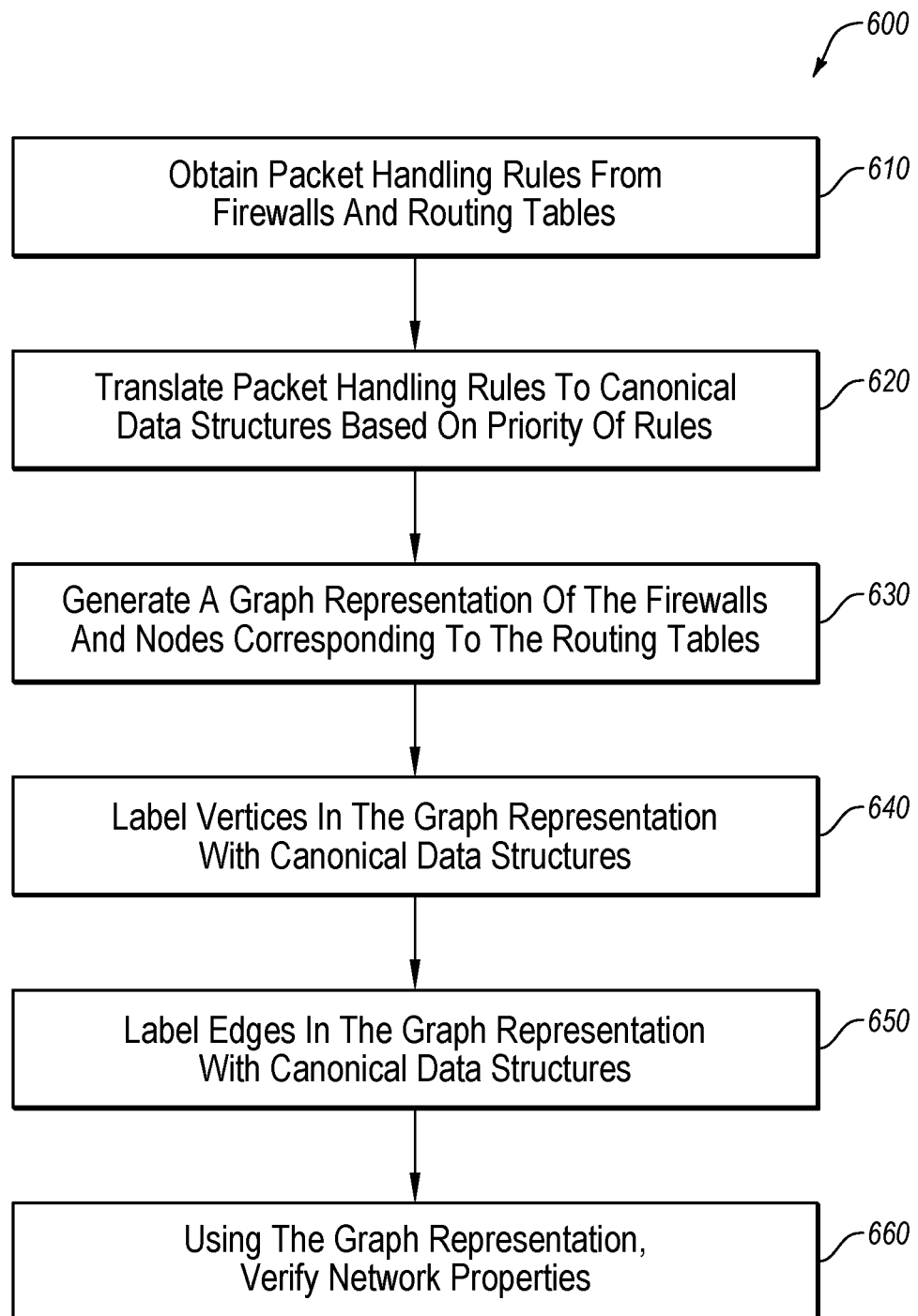
FIG. 6 illustrates a flowchart of another example method of network property verification.

FIG. 6 illustrates a flowchart of another example method 600 of network property verification, in accordance with one or more embodiments of the present disclosure.

At block 610, packet handling rules may be obtained from at least one firewall and at least one routing table in a network. The operation 610 may be similar or comparable to the operation 410 of FIG. 4.

At block 620, the packet handling rules may be translated into canonical data structures based on the priority of packet handling rules for the firewall or routing table. For example, the canonical data structures may represent a subset of packets that are affected by one or more corresponding packet handling rules such that each packet handling rule is covered by at least one canonical data structure. In some embodiments, the canonical data structures may include PECs. The canonical data structures may be determined based on the priority of rules. For example, a higher priority rule may already have created or utilized a PEC or other canonical data structure that may be used to label a particular packet handling rule. Additionally or alternatively, a given rule may cause the creation of one or more additional PECs based on the ranges of addresses of packets covered by PECs of higher priority rules.

At block 630, a graph representation may be generated of the firewalls and nodes corresponding to the routing tables in the network. For example, each node in the network may be represented by a vertex in the graph representation and the connections between the nodes in the network may be presented by edges in the graph representation.

At block 640, the vertices in the graph representation may be labeled with the canonical data structures associated with the firewalls of the nodes. For example, as described above with respect to the PECs, the packet handling rules of the firewalls may be labeled with the corresponding canonical data structures rather than the address ranges and protocols of the rules. The packet handling rules for the firewall of a given node that indicate the node accepts such packets may label the corresponding vertex with the canonical data structures of those packet handling rules.

At block 650, the edges in the graph representation may be labeled with the canonical data structures associated with the routing tables of the nodes. For example, for a given node with a routing table, the canonical data structures associated with the given packet handling rule may be applied to the edge between the node with the routing table and the next hop node such that the edge is labeled with the canonical data structures.

At block 660, using the graph representation, properties of the network may be verified. The block 660 may be similar or comparable to the block 450 of FIG. 4. Additionally, various examples of the implementation of the block 660 may be included in FIGS. 7-11.

Figure 7:
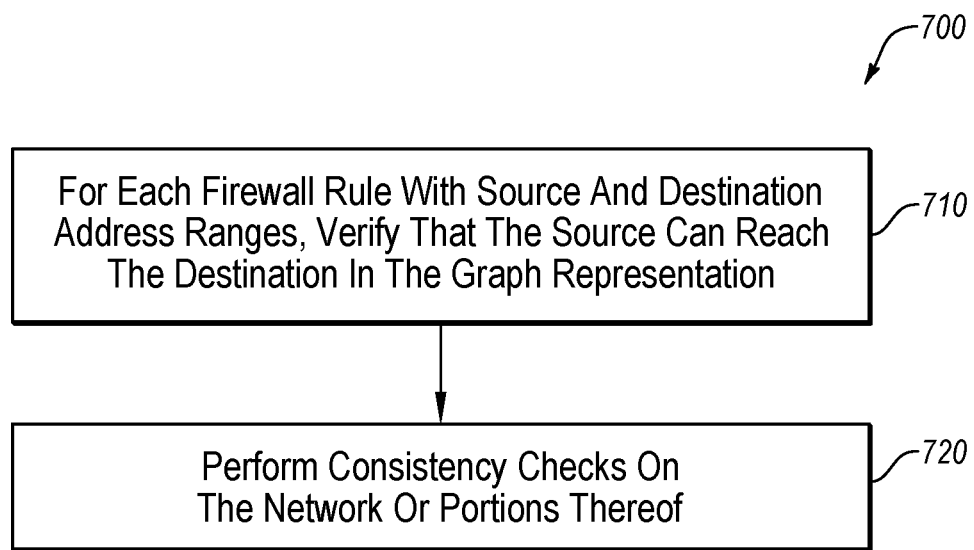
FIG. 7 illustrates a flowchart providing an example implementation of and/or greater detail to one or more blocks of the flowchart of FIG. 6, such as block 660.

FIG. 7 illustrates a flowchart providing an example implementation of and/or greater detail to one or more blocks of the flowchart of FIG. 6, such as block 660, in accordance with one or more embodiments of the present disclosure.

At block 710, verification may be performed that a source can reach a destination in a graph representation for each firewall packet handling rule with a source and a destination. For example, using a graph representation such as that illustrated in FIG. 3, a reachability inquiry may be performed within the graph representation to determine whether a source can reach the destination for a given firewall rule that indicates that packets are to be accepted at a given node. If an expected destination cannot be reached, the violation may be flagged as an error. For example, for a given packet handling rule at a firewall, it may be verified that the canonical data structure occurs at each edge and each vertex from the source to the destination. For example, with reference to FIG. 3, the canonical data structure G appears at node $n_0$, $n_2$, and $n_3$ as well as the edges between them such that, for at least that portion of the path between source and destination, the path may be verified.

At block 720, one or more consistency checks may be performed on the network or portions thereof, based on the labeled graph representation. For example, the graph representation may be utilized to verify that packet handling rules between the firewalls and routing tables are consistent, and that packet handling rules within various portions of the network are consistent. Examples of such consistency checks may be described with reference to FIGS. 8-10.

Figure 8:
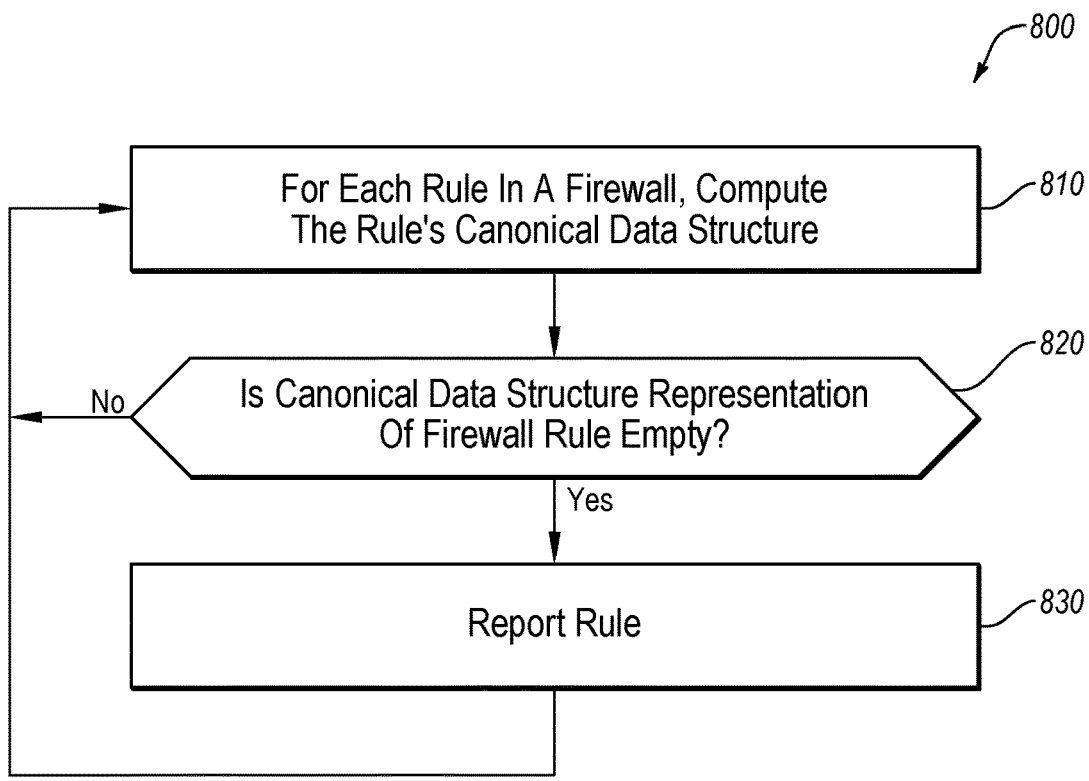
FIG. 8 illustrates a flowchart providing another example implementation of and/or greater detail to one or more blocks of the flowchart of FIG. 6, such as block 660.

FIG. 8 illustrates a flowchart providing a method 800 of another example implementation of and/or greater detail to one or more blocks of the flowchart of FIG. 6, such as block 660 and/or the flowchart of FIG. 7 such as the block 720, in accordance with one or more embodiments of the present disclosure.

At block 810, the canonical data structures for a rule may be computed. The block 810 may be repeated for each packet handling rule in a network or portion of a network to be analyzed. For example, the packet handling rules of all of the firewalls and routing tables in a network may be analyzed such that the canonical data structures for the rules may be computed. Additionally, the cardinality of each of the canonical data structures may be determined, for example, as described with reference to FIG. 5 using PECs as the canonical data structure.

At block 820, a determination may be made whether a canonical data structure representation of a given rule is empty. For example, for a given rule, a determination may be made whether any PECs apply to a given rule in light of the higher priority rules of the node. If the given rule is empty, the method 800 may proceed to the block 830. If not, the method 800 may return to the block 810. The block 820 may be repeated for each packet handling rule such that each rule may be analyzed to determine whether or not it is empty.

At block 830, for a rule that is empty, the associated rule may be reported as having an associated error. For example, with reference to the second rule of node $n_2$ and as illustrated in TABLE 6, the set of PECs is the empty set. In these and other embodiments, such a rule may be inadvertently not performing any function as there are no packets affected by the rule.

As illustrated in FIG. 8, by using PECs a control device may detect rules that are superfluous or that are not working as intended. Such detection may permit the trimming of excess rules or the correction of unintended overlap in rule coverage.

Figure 9:
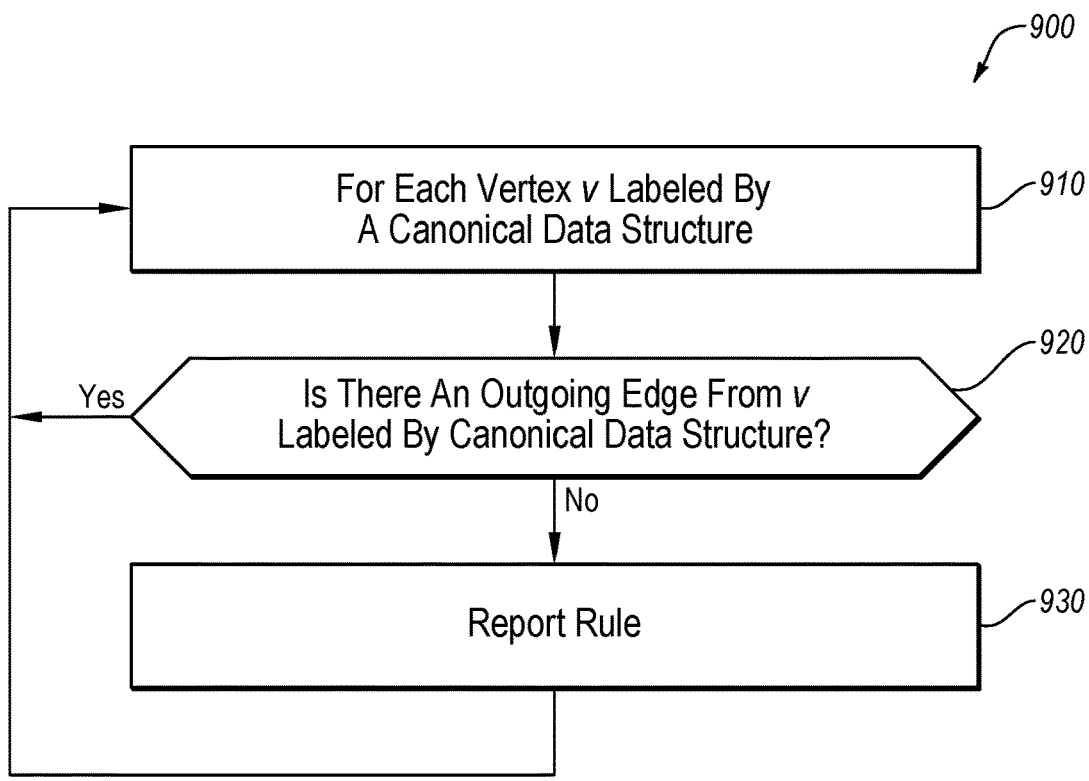
FIG. 9 illustrates a flowchart providing an additional example implementation of and/or greater detail to one or more blocks of the flowchart of FIG. 6, such as block 660.

FIG. 9 illustrates a flowchart providing an additional example implementation of and/or greater detail to one or more blocks of the flowchart of FIG. 6, such as block 660 and/or the flowchart of FIG. 7 such as the block 720, in accordance with one or more embodiments of the present disclosure.

At block 910, a set of vertexes v in a graph representation that are labeled by a canonical data structure are gathered, obtained, or otherwise observed. For each vertex v in the set, the operation of the block 920 is performed.

At block 920, a determination may be made whether, for each canonical data structure of the vertex v, there is an outgoing edge from the vertex v labeled with the canonical data structure. For example, with reference to the labeled representation 300 of FIG. 3, the node $n_0$ may be labeled with the PECs G, J, and L. The set 315 includes the PEC J and the set 305 includes the PECs G and L. In this example, the vertex $n_0$ has each PEC of the node also labeled on an outgoing edge so the method 900 proceeds back to the block 910 to consider the next vertex in the set. As another example with reference to the labeled representation 300 of FIG. 3, the node $n_1$ is labeled with the PEC C. However, the set 325 of PECs associated with the outgoing edge does not include the PEC C. In this example, the rule associated with the PEC C at the vertex $v_1$ follows the "No" branch and the method 900 proceeds to the block 930.

At block 930, the rule from the block 920 may be reported as a potential network issue. For example, the rule of the node associated with a canonical data structure labeled at the vertex but not labeled on an outgoing node corresponds to a firewall packet handling rule that accepts a set of packets but has nowhere to route those packets. In these and other embodiments, such a rule may be flagged or otherwise reported to an administrator or control device to verify that such a situation is intentional.

Figure 10:
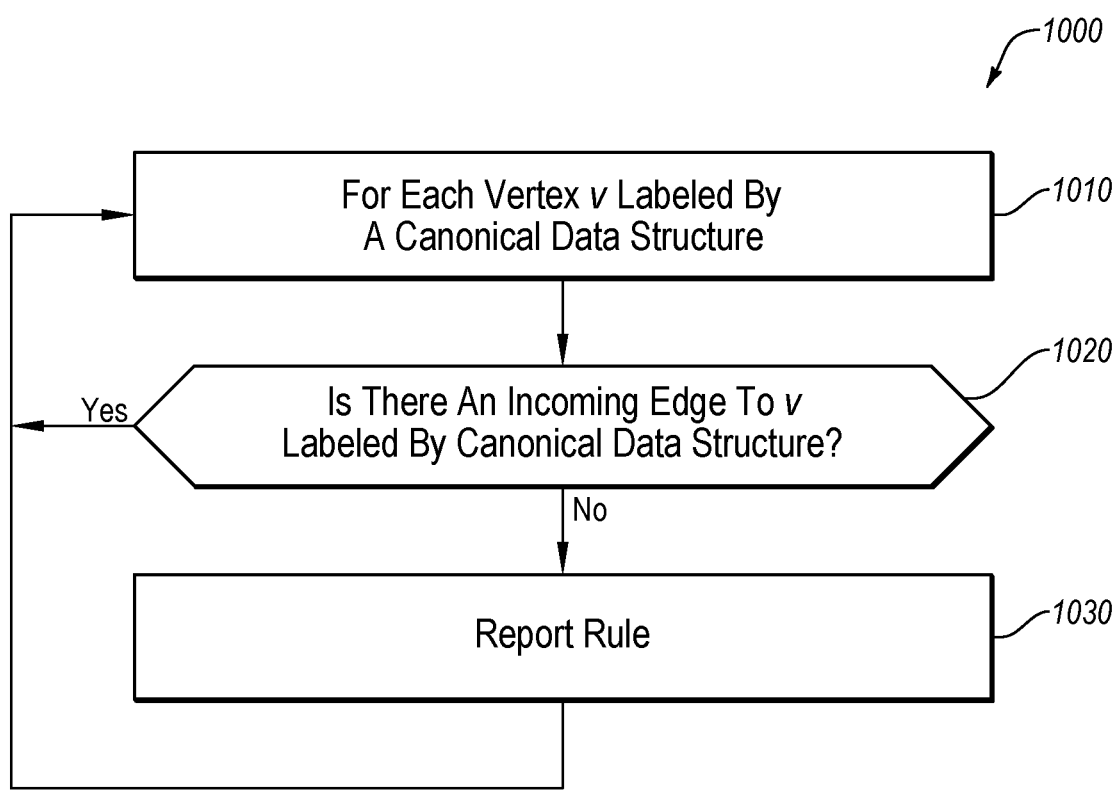
FIG. 10 illustrates a flowchart providing another example implementation of and/or greater detail to one or more blocks of the flowchart of FIG. 6, such as block 660.

FIG. 10 illustrates a flowchart providing another example implementation of and/or greater detail to one or more blocks of the flowchart of FIG. 6, such as block 660 and/or the flowchart of FIG. 7 such as the block 720, in accordance with one or more embodiments of the present disclosure.

At block 1010, a set of vertexes v in a graph representation that are labeled by a canonical data structure are gathered, obtained, or otherwise observed. For each vertex v in the set, the operation of the block 1020 is performed. The block 1010 may be similar or comparable to the block 910 of FIG. 9.

At block 1020, a determination may be made whether, for each canonical data structure of the vertex v, there is an incoming edge from the vertex v labeled with the canonical data structure. For example, with reference to the labeled representation 300 of FIG. 3, the node $n_1$ may be labeled with the PEC C. The set 315 incoming to the node $n_1$ includes the PEC C. In this example, the vertex $n_1$ has each PEC of the node also labeled on an incoming edge so the method 1000 proceeds back to the block 1010 to consider the next vertex in the set. As another example with reference to the labeled representation 300 of FIG. 3, the node $n_2$ is labeled with the PECs E, G, H, I, J, K, and L. However, neither the set 325 nor the set 305 of PECs associated with the incoming edges include the PEC E, H, or J. In this example, the rules associated with the PECs E, H, and J at the node $n_2$ follows the "No" branch and the method 1000 proceeds to the block 1030.

At block 1030, the rule from the block 1020 may be reported as a potential network issue. For example, the rule of the node associated with a canonical data structure labeled at the vertex but not labeled on an incoming node corresponds to a firewall packet handling rule that accepts a set of packets but has no incoming routes that route those packets to the associated node in the network. In these and other embodiments, such a rule may be flagged or otherwise reported to an administrator or control device to verify that such a situation is intentional.

Figure 11:
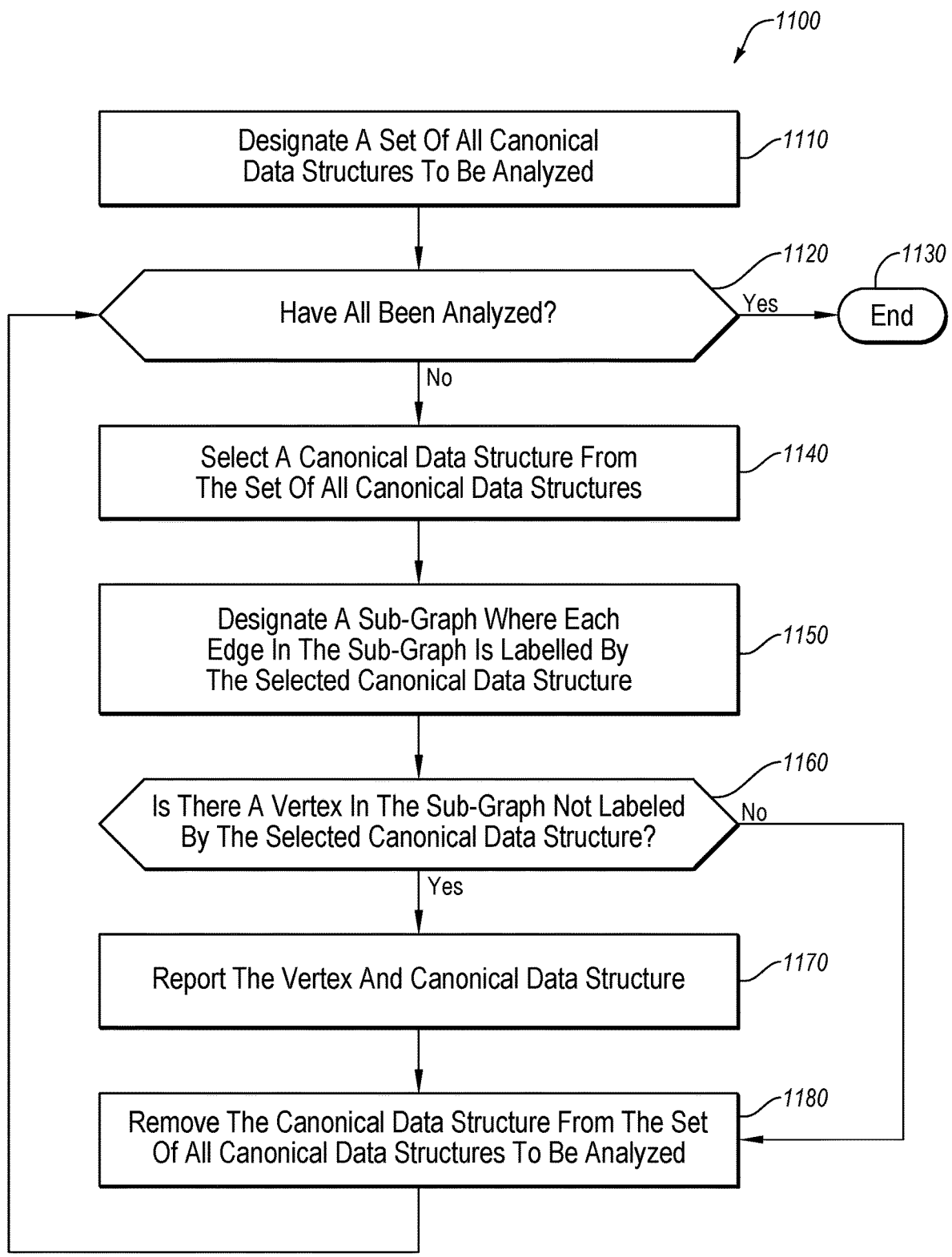
FIG. 11 illustrates a flowchart providing another example implementation of and/or greater detail to one or more blocks of the flowchart of FIG. 6, such as block 660.

FIG. 11 illustrates a flowchart providing another example implementation of and/or greater detail to one or more blocks of the flowchart of FIG. 6, such as block 660, in accordance with one or more embodiments of the present disclosure.

At block 1110, a set of all canonical data structures to be analyzed may be designated. The set of canonical data structures may include canonical data structures such that the set of all canonical data structures completely covers the space of possible packets. In some embodiments, the canonical data structures may be PECs.

At block 1120, a determination may be made whether all canonical data structures in the set from block 1110 have been analyzed. If all canonical data structures have been analyzed, the method 1100 may proceed to the block 1130. If additional canonical data structures in the set from block 1110 remain to be analyzed, the method 1100 may proceed to the block 1140.

At block 1140, a canonical data structure from the set of canonical data structures may be selected for analysis.

At block 1150, a sub-graph within a graph representation may be designated based on each edge in the sub-graph being labeled with the selected canonical data structure. For example, with reference to the labeled representation 300 of FIG. 3, using the PEC G, a sub-graph may be designated as the 3 edges between nodes $n_0$ and $n_2$, $n_1$ and $n_2$, and $n_2$ and $n_3$, and the nodes $n_0$, $n_1$, $n_2$, and $n_3$.

At block 1160, a determination may be made whether there is a vertex in the sub-graph that is not labeled with the selected canonical data structure. Following the example above, using the PEC G in the subgraph, the nodes $n_0$, $n_2$, and $n_3$ are labeled with the PEC G. However, the node $n_1$ is not labeled with the PEC G. If there are no vertices that are not labeled with the selected canonical data structure, the method 1100 may proceed to the block 1180. If there are one or more vertices in the sub-graph that are not labeled by the selected canonical data structure, the method 1100 may proceed to the block 1170.

At block 1170, the vertex and selected data structure from the block 1160 may be reported as a potential network issue. For example, the vertex not labeled with the canonical data structure may correspond to one or more firewall packet handling rules that do not accept a set of packets identified as being routed through the sub-graph. In these and other embodiments, the vertex and canonical data structure may be flagged or otherwise reported to an administrator or control device to verify that such a situation is intentional.

At block 1180, the selected canonical data structure may be removed from the set of all canonical data structures to be analyzed. The method 1100 may return to the block 1120 to determine if any additional canonical data structures are in the set to be analyzed.

Figure 12:
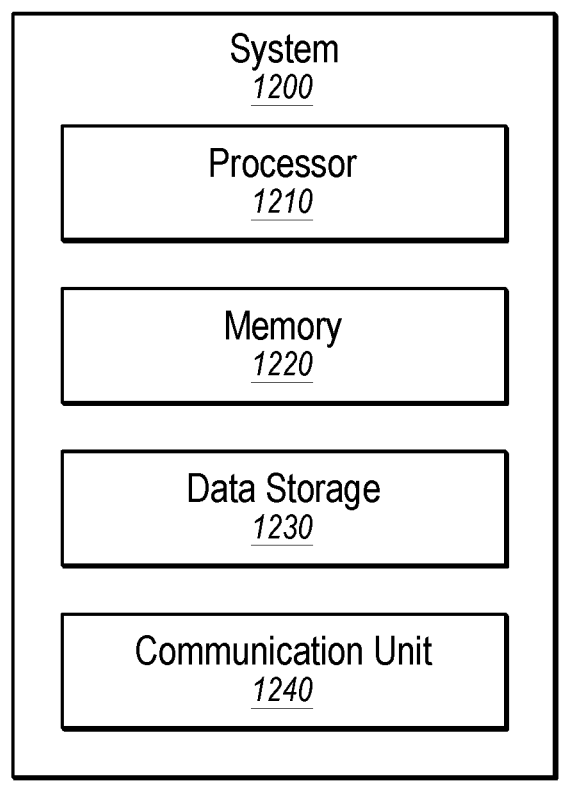
FIG. 12 illustrates an example computing system.

FIG. 12 illustrates an example computing system 1200, according to at least one embodiment described in the present disclosure. The system 1200 may include any suitable system, apparatus, or device configured to verify network properties or function as a network device in such a network to be verified. The computing system 1200 may include a processor 1210, a memory 1220, a data storage 1230, and a communication unit 1240, which all may be communicatively coupled. The data storage 1230 may include various types of data, such as packet handing rules including forwarding rules in a routing table or rules associated with a firewall.

Generally, the processor 1210 may include any suitable special-purpose or general-purpose computer, computing entity, or processing device including various computer hardware or software modules and may be configured to execute instructions stored on any applicable computer-readable storage media. For example, the processor 1210 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 12, it is understood that the processor 1210 may include any number of processors distributed across any number of network or physical locations that are configured to perform individually or collectively any number of operations described in the present disclosure. In some embodiments, the processor 1210 may interpret and/or execute program instructions and/or process data stored in the memory 1220, the data storage 1230, or the memory 1220 and the data storage 1230. In some embodiments, the processor 1210 may fetch program instructions from the data storage 1230 and load the program instructions into the memory 1220.

After the program instructions are loaded into the memory 1220, the processor 1210 may execute the program instructions, such as instructions to perform the methods 400, 500, 600, 700, 800, 900, 1000, and/or 1100 of FIGS. 4-11, respectively. For example, the processor 1210 may obtain packet handling rules of nodes in a network (such as rules from routing tables and/or firewalls), and may generate a graph representation of the network. As another example, the processor 1210 may apply verify various network properties using such a graph representation.

The memory 1220 and the data storage 1230 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 1210. In some embodiments, the computing system 1200 may or may not include either of the memory 1220 and the data storage 1230.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 1210 to perform a certain operation or group of operations.

The communication unit 1240 may include any component, device, system, or combination thereof that is configured to transmit or receive information over a network. In some embodiments, the communication unit 1240 may communicate with other devices at other locations, the same location, or even other components within the same system. For example, the communication unit 1240 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 1240 may permit data to be exchanged with a network and/or any other devices or systems described in the present disclosure. For example, the communication unit 1240 may allow the system 1200 to communicate with other systems, such as network devices, control devices, and/or other networks.

Modifications, additions, or omissions may be made to the system 1200 without departing from the scope of the present disclosure. For example, the data storage 1230 may be multiple different storage mediums located in multiple locations and accessed by the processor 1210 through a network.

As indicated above, the embodiments described in the present disclosure may include the use of a special purpose or general purpose computer (e.g., the processor 1210 of FIG. 12) including various computer hardware or software modules, as discussed in greater detail below. Further, as indicated above, embodiments described in the present disclosure may be implemented using computer-readable media (e.g., the memory 1220 or data storage 1230 of FIG. 12) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method, comprising:
    obtaining a plurality of packet handling rules from a plurality of distinct network routing devices in a network;
    generating a transitive reduction of a partially ordered set of elements, the elements corresponding to match conditions in the packet handling rules, each match condition representing a set of packets identified by packet headers;
    generating a plurality of packet equivalence classes by removing children elements from a parent element in the transitive reduction of the partially ordered set of elements such that a packet equivalence class corresponding to the parent element excludes and is handled differently from a packet equivalence class corresponding to the children elements, each packet equivalence class covering a disjoint set of packets, each packet equivalence class identified by fields in the packet headers, the fields including at least one of source address, destination address, and protocol of packets, the packet equivalence classes representing a group of packets treated in a same manner in the network;
    generating a graph representation of the plurality of distinct network routing devices and utilizing the packet equivalence classes; and
    using the graph representation, verifying one or more properties of operation of the network to identify network issues.

2. The method of claim 1, wherein the packet equivalence classes are independent of a manufacturer of the network routing devices in the network.

3. The method of claim 1, wherein obtaining the plurality of packet handling rules includes:
    obtaining at least one packet handling rule from a forwarding table; and
    obtaining at least one packet handling rule from a firewall.

4. The method of claim 1, wherein at least one of the packet handling rules includes an action to drop packets in the packet equivalence class.

5. The method of claim 4, wherein the packet handling rule that includes the action to drop packets further includes a protocol such that packets of the protocol are dropped.

6. The method of claim 1, further comprising determining cardinality of the plurality of packet equivalence classes.

7. The method of claim 1, wherein generating the plurality of packet equivalence classes includes:
    designating a first element of the transitive reduction of the partially ordered set of elements as a first set of packets;
    designating a second element of the transitive reduction of the partially ordered set of elements as a second set of packets, the second set of packets subsumed within the first set of packets;
    subtracting the second set of packets and any additional sets of packets subsumed within the first set of packets from the first set of packets; and
    designating any remaining packets of the first set of packets as a first packet equivalence class.

8. The method of claim 1, wherein generating the graph representation includes:
    labeling a vertex in the graph representation with packet equivalence classes that are accepted by a routing device corresponding to the vertex; and
    labeling an edge with packet equivalence classes that are routed along the edge.

9. A non-transitory computer readable medium including instructions that, when executed by one or more processors, are configured to perform or control performance of operations, the operations comprising:
    obtaining a plurality of packet handling rules from a plurality of distinct network routing devices in a network;
    generating a transitive reduction of a partially ordered set of elements, the elements corresponding to match conditions in the packet handling rules, each match condition representing a set of packets identified by packet headers;
    generating a plurality of packet equivalence classes by removing children elements from a parent element in the transitive reduction of the partially ordered set of elements such that a packet equivalence class corresponding to the parent element excludes and is handled differently from a packet equivalence class corresponding to the children elements, each packet equivalence class covering a disjoint set of packets, each packet equivalence class identified by fields in the packet headers, the fields including at least one of source address, destination address, and protocol of packets, the packet equivalence classes representing a group of packets treated in a same manner in the network;
    generating a graph representation of the plurality of distinct network routing devices and utilizing the packet equivalence classes; and
    using the graph representation, verifying one or more properties of operation of the network to identify network issues.

10. The computer readable medium of claim 9, wherein the packet equivalence classes are independent of a manufacturer of the network routing devices in the network.

11. The computer readable medium of claim 9, wherein obtaining the plurality of packet handling rules includes:
   obtaining at least one packet handling rule from a forwarding table; and
   obtaining at least one packet handling rule from a firewall.

12. The computer readable medium of claim 9, wherein at least one of the packet handling rules includes an action to drop packets in the packet equivalence class.

13. The computer readable medium of claim 12, wherein the packet handling rule that includes the action to drop packets further includes a protocol such that packets of the protocol are dropped.

14. The computer readable medium of claim 9, further comprising determining cardinality of the plurality of packet equivalence classes.

15. The computer readable medium of claim 9, wherein generating the plurality of packet equivalence classes includes:
   designating a first element of the transitive reduction of the partially ordered set of elements as a first set of packets;
   designating a second element of the transitive reduction of the partially ordered set of elements as a second set of packets, the second set of packets subsumed within the first set of packets;
   subtracting the second set of packets and any additional sets of packets subsumed within the first set of packets from the first set of packets; and
   designating any remaining packets of the first set of packets as a first packet equivalence class.

16. The computer readable medium of claim 9, wherein generating the graph representation includes:
   labeling a vertex in the graph representation with packet equivalence classes that are accepted by a routing device corresponding to the vertex; and
   labeling an edge with packet equivalence classes that are routed along the edge.

17. A system comprising:
   one or more processors; and
   one or more non-transitory computer readable media including instructions that, when executed by the one or more processors, are configured to perform or control performance of operations, the operations comprising:
      obtaining a plurality of packet handling rules from a plurality of distinct network routing devices in a network;
      generating a transitive reduction of a partially ordered set of elements, the elements corresponding to match conditions in the packet handling rules, each match condition representing a set of packets identified by packet headers;
      generating a plurality of packet equivalence classes by removing children elements from a parent element in the transitive reduction of the partially ordered set of elements such that a packet equivalence class corresponding to the parent element excludes and is handled differently from a packet equivalence class corresponding to the children elements, each packet equivalence class covering a disjoint set of packets, each packet equivalence class identified by fields in the packet headers, the fields including at least one of source address, destination address, and protocol of packets, the packet equivalence classes representing a group of packets treated in a same manner in the network;
      generating a graph representation of the plurality of distinct network routing devices and utilizing the packet equivalence classes; and
      using the graph representation, verifying one or more properties of operation of the network to identify network issues.

18. The system of claim 17, wherein obtaining the plurality of packet handling rules includes:
   obtaining at least one packet handling rule from a forwarding table; and
   obtaining at least one packet handling rule from a firewall.

19. The system of claim 17, the operations further comprising determining cardinality of the plurality of packet equivalence classes.

20. The system of claim 17, wherein generating the plurality of packet equivalence classes includes:
   designating a first element of the transitive reduction of the partially ordered set of elements as a first set of packets;
   designating a second element of the transitive reduction of the partially ordered set of elements as a second set of packets, the second set of packets subsumed within the first set of packets;
   subtracting the second set of packets and any additional sets of packets subsumed within the first set of packets from the first set of packets; and
   designating any remaining packets of the first set of packets as a first packet equivalence class.

* * * * *